(12) United States Patent
Mai et al.

(10) Patent No.: US 11,597,174 B2
(45) Date of Patent: Mar. 7, 2023

(54) EYEGLASS LENS MATERIAL AND EYEGLASS LENS CAPABLE OF BLOCKING BLUE LIGHT AND METHOD FOR MAKING THE SAME

(71) Applicant: Tianchen Innovative Materials Technology Co., Ltd., Hsinchu (TW)

(72) Inventors: Yu-Shen Mai, Hsinchu (TW); Hsin-Ying Chou, Hsinchu (TW); Ko-Sen Lee, Hsinchu (TW)

(73) Assignee: Tianchen Innovative Materials Technology Co., Ltd., Hsinchu (TW)

( * ) Notice: Subject to any disclaimer, the term of this patent is extended or adjusted under 35 U.S.C. 154(b) by 481 days.

(21) Appl. No.: 16/813,712

(22) Filed: Mar. 9, 2020

(65) Prior Publication Data
US 2021/0223574 A1    Jul. 22, 2021

(30) Foreign Application Priority Data

Jan. 21, 2020   (TW) .................. 109102279

(51) Int. Cl.
*B29D 11/00*    (2006.01)
*G02C 7/10*    (2006.01)
(Continued)

(52) U.S. Cl.
CPC .. *B29D 11/00442* (2013.01); *B29D 11/00067* (2013.01); *C08K 3/08* (2013.01);
(Continued)

(58) Field of Classification Search
CPC .............. G02C 7/104; B29D 11/00442; B29D 11/00067; G02B 1/041; G02B 1/043;
(Continued)

(56) References Cited

U.S. PATENT DOCUMENTS

| 2009/0035548 A1* | 2/2009 | Aiki ........................ G02B 1/04 523/205 |
| 2014/0213685 A1* | 7/2014 | Jan .......................... C08L 83/08 526/263 |
| 2015/0036234 A1 | 2/2015 | Ben-Yakar et al. |

FOREIGN PATENT DOCUMENTS

| CN | 104692401 | 6/2015 |
| CN | 105622835 | 6/2016 |

OTHER PUBLICATIONS

"Office Action of Taiwan Counterpart Application", dated Aug. 13, 2020, p. 1-p. 8.
(Continued)

*Primary Examiner* — Mathieu D Vargot
(74) *Attorney, Agent, or Firm* — JCIPRNET (57) ABSTRACT

An eyeglass lens material can be used to make an eyeglass lens and at least includes a mixture of Ag/SiO$_x$ composite nanoparticles and at least one type of monomer. The eyeglass lens is capable of blocking blue light. The monomer undergoes a material curing procedure to form a main body that contains and is mixed with the Ag/SiO$_x$ composite nanoparticles. As the Ag/SiO$_x$ composite nanoparticles in the eyeglass lens material can absorb relatively high-energy blue light, a contact lens made of the eyeglass lens material can block blue light.

9 Claims, 5 Drawing Sheets

(51) Int. Cl.
    *G02B 1/04*           (2006.01)
    *C08K 3/08*           (2006.01)
    *C08K 3/36*           (2006.01)
    *B29K 509/02*         (2006.01)
    *B29K 33/00*          (2006.01)
    *B29K 105/00*         (2006.01)

(52) U.S. Cl.
    CPC ............... *C08K 3/36* (2013.01); *G02B 1/041* (2013.01); *G02B 1/043* (2013.01); *G02C 7/104* (2013.01); *B29K 2033/12* (2013.01); *B29K 2039/06* (2013.01); *B29K 2105/0002* (2013.01); *B29K 2509/02* (2013.01); *B29K 2995/003* (2013.01); *C08K 2003/0806* (2013.01); *C08K 2201/011* (2013.01)

(58) Field of Classification Search
    CPC .... C08K 3/08; C08K 3/36; C08K 2003/0806; C08K 2201/011
    See application file for complete search history.

(56) References Cited

OTHER PUBLICATIONS

Office Action of China Counterpart Application, dated Mar. 23, 2022, pp. 1-28.

\* cited by examiner

EYEGLASS LENS MATERIAL AND EYEGLASS LENS CAPABLE OF BLOCKING BLUE LIGHT AND METHOD FOR MAKING THE SAME

CROSS-REFERENCE TO RELATED PATENT APPLICATION

This non-provisional application claims priority to and the benefit of, under 35 U.S.C. § 119(a), Taiwan Patent Application No. 109102279, filed in Taiwan on Jan. 21, 2020. The entire content of the above identified application is incorporated herein by reference.

FIELD

The present disclosure relates to an eyeglass lens that can block blue light. More particularly, the present disclosure relates to an eyeglass lens made of an eyeglass lens material into which Ag/SiO$_x$ composite nanoparticles are mixed.

BACKGROUND

With the increasing prevalence of 3C (computer, communication, and consumer electronics) products such as liquid crystal displays, smartphones, and tablet computers, and with the public spending more and more time using 3C products (in particular watching the contents displayed by such products), the issue that "blue light is injurious to the eyes" has gradually attracted serious attention. Currently, the three common theories of "blue light injuring the eyes" are: (1) blue light tends to be scattered by the object it falls on such that one who views the object may not obtain a clear visual image of the object but experience eye fatigue as a result; (2) blue light increases the risk of age-related macular degeneration (AMD) and retinopathy; and (3) blue light hinders sleep by delaying or stopping the brain from secreting melatonin.

Generally, light of a wavelength ranging from 400 nm to 700 nm is referred to as visible light, in which blue light whose wavelength ranges from 465 nm to 495 nm (also known as greenish blue light) can regulate biological rhythms, while blue light whose wavelength ranges from 415 nm to 455 nm (also known as purplish blue light) can easily penetrate the cornea and the lens of the human eye due to its relatively short wavelength and hence relatively high energy, generating oxides and free radicals that may damage the photoreceptor cells in the retina (i.e., the rod cells, the cone cells, and the pigment epithelium of the retina). The latter blue light is the "blue light" mentioned above that is injurious to the eyes. As the backlight of a 3C product is typically a mixture of light emitted by red, green, and blue light-emitting diodes (LEDs), in which the blue LEDs are generally designed to generate high-energy blue light (purplish blue light), the aforesaid injury to the eyes is likely to occur if the contents displayed by such a 3C product are watched continuously over a long time.

In view of the above, more and more people begin to wear blue light-blocking eyeglasses in order to reduce the damage that blue light (purplish blue light) may cause to the eyes. Blue light-blocking eyeglasses nowadays mainly include a yellow dye added to the lenses or a coating on the lens surface to change the lens color and thereby enable the lenses to filter out blue light. When it comes to contact lenses, however, the blue light blocking rate achieved by this dyeing or coating approach is only about 15%~25%, which is lower than required by most users. The issue to be addressed by the present disclosure is to provide eyeglass lens users with better blue light-blocking products.

SUMMARY

One aspect of the present disclosure is directed to an eyeglass lens material that can block blue light. The eyeglass lens material can be used to make eyeglass lenses and at least includes a mixture of Ag/SiO$_x$ composite nanoparticles and at least one type of monomer. The mixture forms a main body through a material curing procedure such that the main body contains and is mixed with the Ag/SiO$_x$ composite nanoparticles. As the Ag/SiO$_x$ composite nanoparticles in the eyeglass lens material can absorb blue light (purplish blue light) that has relatively high energy, a contact lens made of the eyeglass lens material can block blue light.

Another aspect of the present disclosure is directed to an eyeglass lens that can block blue light. The eyeglass lens includes a main body. The main body contains and is mixed with Ag/SiO$_x$ composite nanoparticles such that the eyeglass lens, whose type may vary as needed, produces the expected blue light blocking effect.

Another aspect of the present disclosure is directed to a method for making an eyeglass lens that can block blue light, wherein the eyeglass lens includes a main body. The method begins by dissolving Ag/SiO$_x$ composite nanoparticles in an alcohol solvent and adding a surface modifier into the solution to modify the Ag/SiO$_x$ composite nanoparticles. The modified Ag/SiO$_x$ composite nanoparticles are then mixed into a resin, and the resulting mixture is used to fill a mold. After that, a material curing procedure is performed on the mixture until the mixture is cured to form the main body, which contains and is mixed with the Ag/SiO$_x$ composite nanoparticles. The foregoing process not only allows the modified Ag/SiO$_x$ composite nanoparticles to be evenly distributed in the resin, but also allows the particle size of the intermediate silver nanoparticles to be adjusted to alter the spectrum of the visible light to be absorbed, in order for the eyeglass lens thus made to produce the expected blue light blocking effect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

Figure 1A:
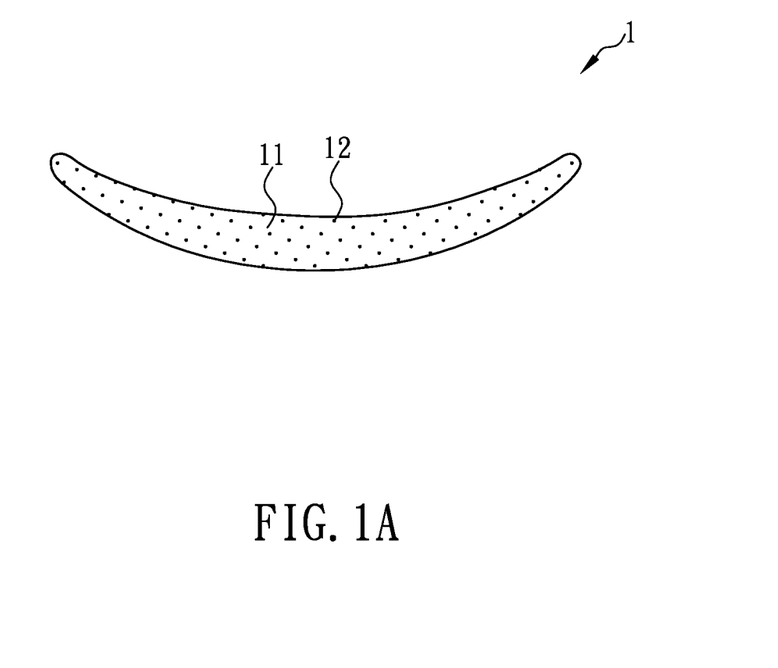
FIG. 1A schematically shows an eyeglass lens according to certain embodiments of the present disclosure.
Figure 1B:
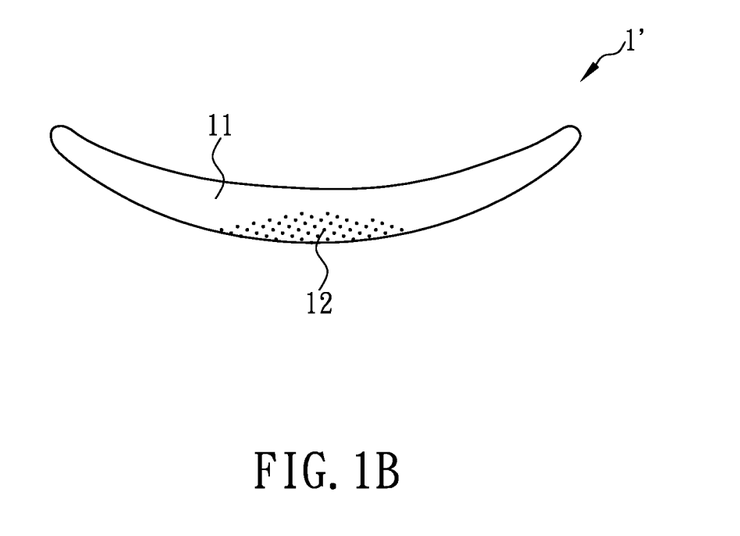
FIG. 1B schematically shows an eyeglass lens according to certain embodiments of the disclosure.

The present disclosure provides an eyeglass lens material, an eyeglass lens that can block blue light and a method for making the same. In certain embodiments, referring to FIG. 1A, the eyeglass lens 1, which may be a contact lens or a lens to be set in an eyeglass frame, includes a main body 11 and the Ag/SiO$_x$ composite nanoparticles 12 mixed therein. The Ag/SiO$_x$ composite nanoparticles 12 may be distributed evenly in the main body 11 (as shown in FIG. 1A), but the present disclosure is not limited thereto. In certain embodiments, as shown in FIG. 1B, the Ag/SiO$_x$ composite nanoparticles 12 are concentrated in a central area of the main body 11, wherein the central area refers to an area of the eyeglass lens 1' (which is made of the main body 11) that corresponds to the pupil of a wearer's eye in which the eyeglass lens 1' is worn.

Figure 2:
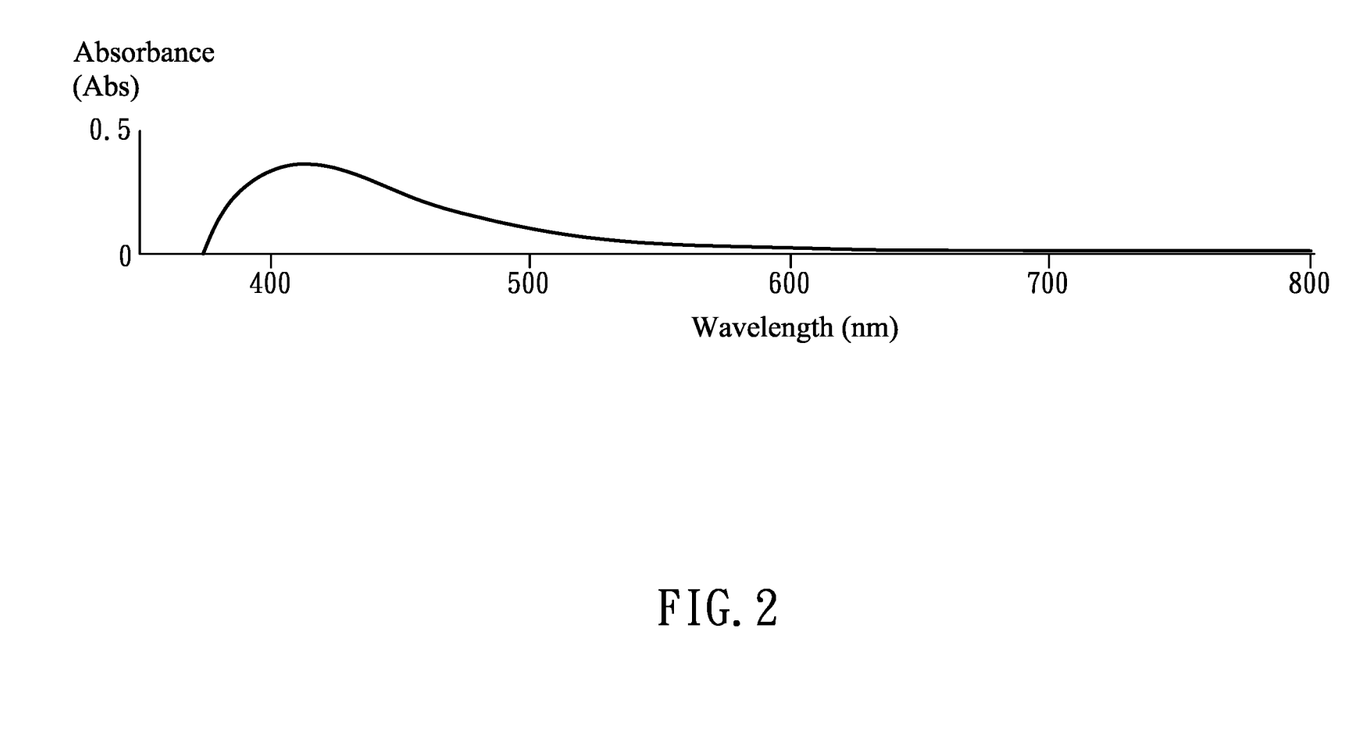
FIG. 2 is a plot showing spectral absorbance of the silver nanoparticles according to certain embodiments of the present disclosure.

Referring to FIG. 2 in conjunction with FIG. 1A, silver particles that are 1 nm to 100 nm in size can absorb blue light whose wavelength ranges from 400 nm to 500 nm; hence, by mixing the Ag/SiO$_x$ composite nanoparticles 12 into the main body 11, the main body 11 is enabled to absorb the relatively high-energy blue light (purplish blue light) in the spectrum of visible light that enters the eyeglass lens 1, thereby achieving the objective of blocking blue light. The eyeglass lens 1 has a blue light blocking rate of about 30%.

Figure 3:
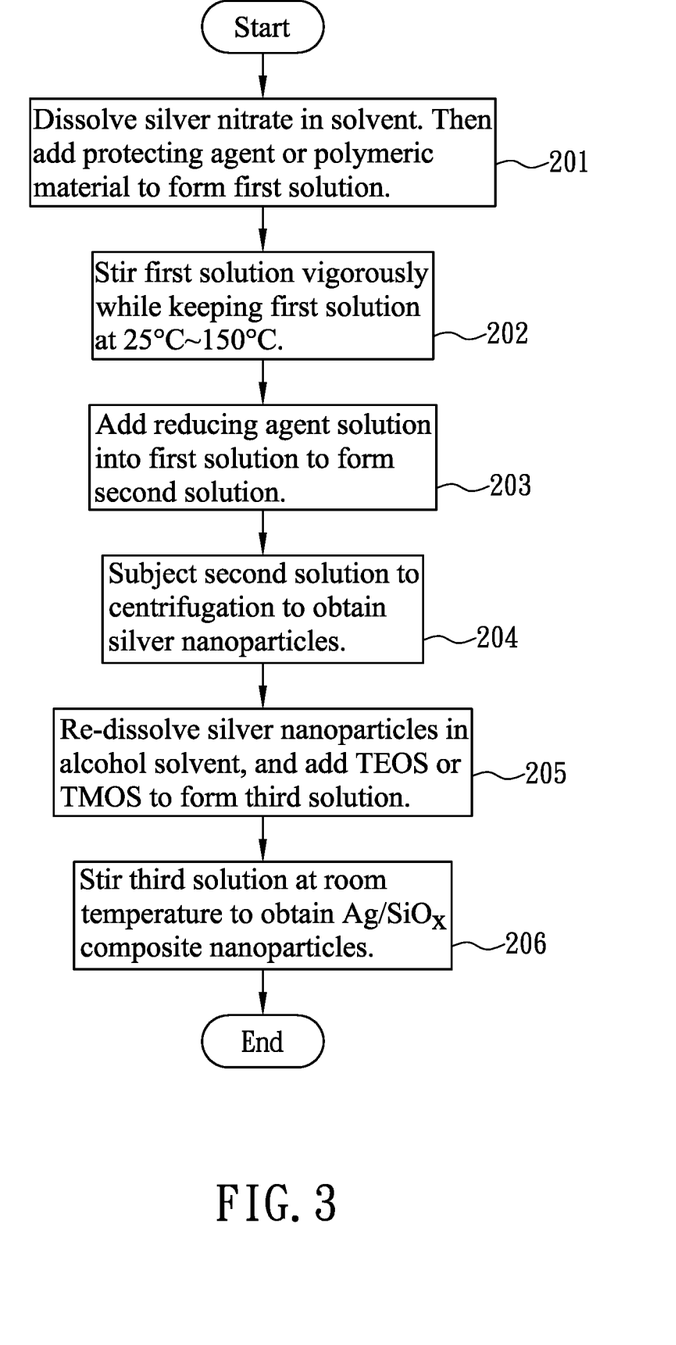
FIG. 3 is the flowchart of a method for making the Ag/SiO$_x$ composite nanoparticles according to certain embodiments of the present disclosure.

A method for making the Ag/SiO$_x$ composite nanoparticles 12 according to certain embodiments of the present disclosure is described below. Referring to FIG. 3 in conjunction with FIG. 1A, step 201 involves dissolving silver nitrate in a solvent and then adding a protecting agent or a polymeric material to form a first solution.

The solvent may be water, methanol, ethanol, propanol (molecular formula: C$_3$H$_7$OH), isopropanol (molecular formula: C$_3$H$_8$O), butanol (molecular formula: C$_4$H$_9$OH), ethylene glycol, etc. The protecting agent may be a surfactant such as hexadecyl trimethyl ammonium bromide, sodium dodecyl sulfate, etc. The polymeric material may be polyvinyl alcohol (PVA), polyethylene glycol (PEG), polyvinylpyrrolidone (PVP), poly(acrylic acid) (PAA), polyethylenimine (PEI), etc. The silver nitrate constitutes 0.01%~10% by weight of the first solution; the protecting agent or polymeric material constitutes 1%~10% by weight of the first solution; and the solvent constitutes the remaining percentage by weight of the first solution.

With continued reference to FIG. 3 and FIG. 1A, step 202 is carried out by stirring the first solution vigorously for about 0.5 hour-1.5 hours while keeping the first solution at a temperature between 25° C. and 150° C. Then, in step 203, the first solution is added with a reducing agent solution, such as a solution of sodium borohydride, of sodium citrate, of vitamin C, etc., and is allowed to rest for 1 hour to form a second solution. In step 204, the second solution is diluted 5-fold with acetone and then poured into a centrifuge tube, which in turn is placed in a centrifuge and spun for 30 minutes at a centrifugation speed of 10000 g. As a result, silver nanoparticles whose particle size ranges from 1 nm to 100 nm are obtained. In step 205, the silver nanoparticles are re-dissolved in an alcohol solvent (e.g., methanol, ethanol, propanol, butanol, ethylene glycol, etc.) and added with tetraethoxysilane (TEOS) or tetramethoxysilane (TMOS) to form a third solution. The TEOS or TMOS makes up 0.01%~10% by weight of the third solution. The third solution may be further added with ammonia water such that the ammonia water makes up 0.1%~10% by weight of the third solution. Lastly, step 206 includes stirring the third solution at room temperate for one day (about 22~26 hours) to obtain the Ag/SiO$_x$ composite nanoparticles 12. In the foregoing process of forming the Ag/SiO$_x$ composite nanoparticles 12, the silver nitrate content of the first solution can be adjusted so as to change the final particle size of the silver nanoparticles (e.g., within the range of 1 nm to 100 nm; the larger the silver nanoparticles, the longer-wavelength blue light the silver nanoparticles will be able to absorb), thus allowing the spectrum of the visible light absorbed to be adjustable. A manufacturer, therefore, can prepare the Ag/SiO$_x$ composite nanoparticles 12 according to practical needs (e.g., a blue light blocking rate of 15%~30%) in order for the resulting eyeglass lens 1 to produce the expected blue light blocking effect.

Figure 4:
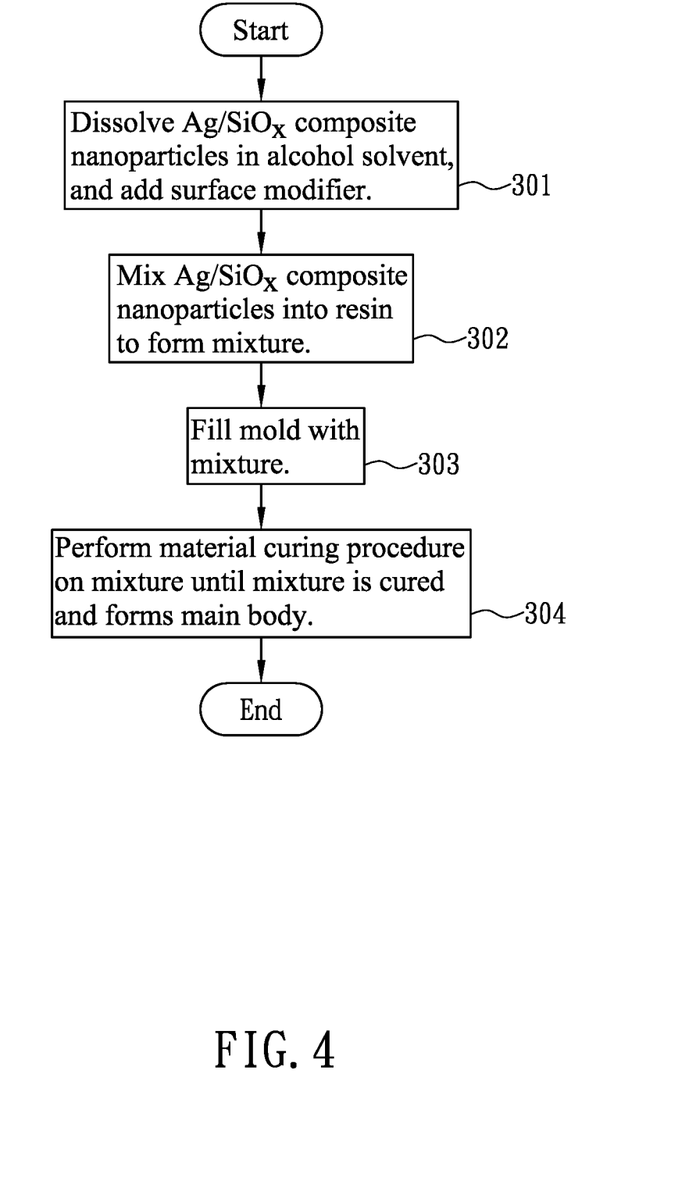
FIG. 4 is the flowchart of a method for making a blue light-blocking eyeglass lens according to certain embodiments of the present disclosure.

Once the Ag/SiO$_x$ composite nanoparticles 12 are obtained, the method described below can be used to mix the Ag/SiO$_x$ composite nanoparticles 12 into the main body 11. Referring to FIG. 4 in conjunction with FIG. 1A, the method for making the eyeglass lens 1 according to certain embodiments of the present disclosure includes the following steps:

Step 301: The Ag/SiO$_x$ composite nanoparticles 12 are dissolved in an alcohol solvent and added with a surface modifier in order to be modified. The surface modifier may be, for example, 3-(trimethoxysilyl)propyl methacrylate, vinylmethyldimethoxysilane, triethoxyvinylsilane, (3-Aminopropyl)triethoxysilane (APTES), etc., so as to modify the functional groups of the Ag/SiO$_x$ composite nanoparticles 12, allowing the Ag/SiO$_x$ composite nanoparticles 12 to disperse evenly in a resin and better link to a monomer.

Step 302: The modified Ag/SiO$_x$ composite nanoparticles 12 are mixed into a resin (e.g., a hydrogel or silicone hydrogel) to form a mixture (i.e., the eyeglass lens material). In certain embodiments, the resin may be formed by polymerizing one or a plurality of monomers selected from the group consisting of (hydroxyethyl)methacrylate (HEMA), ethylene glycol dimethacrylate (EGDMA), N-vinylpyrrolidone, and poly(methyl methacrylate) (PMMA).

Step 303: A mold is then filled with the mixture, wherein the mold at least includes an upper mold portion and a lower mold portion. The upper mold portion can be assembled on the lower mold portion (i.e., to complete the assembly of the mold) after the lower mold portion is filled with the mixture.

Step 304: A material curing procedure is performed on the mixture until the mixture is cured (or polymerized) and thus forms the main body 11, with the $Ag/SiO_x$ composite nanoparticles 12 mixed in the main body 11. In certain embodiments, the $Ag/SiO_x$ composite nanoparticles 12 preferably make up 0.00001%~10% by weight of the main body 11.

The material curing procedure can also be carried out in different ways. In certain embodiments, Step 302 further includes adding a photoinitiator into the mixture. Step 304 may include rotating the mold in order for the mixture in the mold to form the desired shape under centrifugation, and irradiating the mixture with ultraviolet (UV) light so that the resin, or monomer(s), crosslinks with the photoinitiator under UV radiation and is then cured (or polymerized) to form the main body 11, wherein the photoinitiator may be 2,4,6-trimethylbenzoyldiphenyl phosphine oxide (TPO), 2-hydroxy-2-methyl-1-phenyl-1-propanone, 1-hydroxy cyclohexyl phenyl ketone, phenyl bis(2,4,6-trimethylbenzoyl)-phosphine oxide, etc. In certain embodiments, Step 302 can further include adding an initiator into the mixture, and Step 304 can include heating the mixture at a high temperature until the mixture crosslinks with the initiator and is subsequently cured to form the main body 11, wherein the initiator may be azobisisobutyronitrile (AIBN, also known as 2,2'-azobis(2-methylpropionitrile)), phenyl-azo-triphenylmethane, tert-butyl-peroxide (TBP), cumyl peroxide, benzoyl peroxide (BPO), or tert-butyl perbenzoate (TBPB).

Referring back to FIG. 1A, the cured main body 11 is a dry plate when removed from the mold and therefore cannot be used as a contact lens until the completion of an additional hydration procedure (i.e., immersing the dry plate in a liquid until it is expanded and softened) and an additional sterilization procedure. The cured and unmolded main body 11 can also go through a cutting, grinding, or other procedure in order to form a lens to be set in an eyeglass frame. Moreover, if the main body 11 is intended as a contact lens, each of the hydration procedure and the sterilization procedure may be preceded or followed by other procedures such as automated optical inspection (AOI), product collection, and extraction, depending on the product requirements of the eyeglass lens 1. It should be pointed out that if the mold in Step 303 is filled only with the mixture, a main body 11 as shown in FIG. 1A will be formed (i.e., with the $Ag/SiO_x$ composite nanoparticles 12 distributed evenly in the main body 11); and if the mold is filled first with a small amount of the mixture and then with pure resin (i.e., resin that does not contain the $Ag/SiO_x$ composite nanoparticles 12), a main body 11 as shown in FIG. 1B will be formed (i.e., with the $Ag/SiO_x$ composite nanoparticles 12 concentrated in a central area of the main body 11). The term "a small amount" is a relative term to be understood by comparing the amounts of the mixture (or the $Ag/SiO_x$ composite nanoparticles 12) in FIG. 1A and FIG. 1B.

Figure 5:
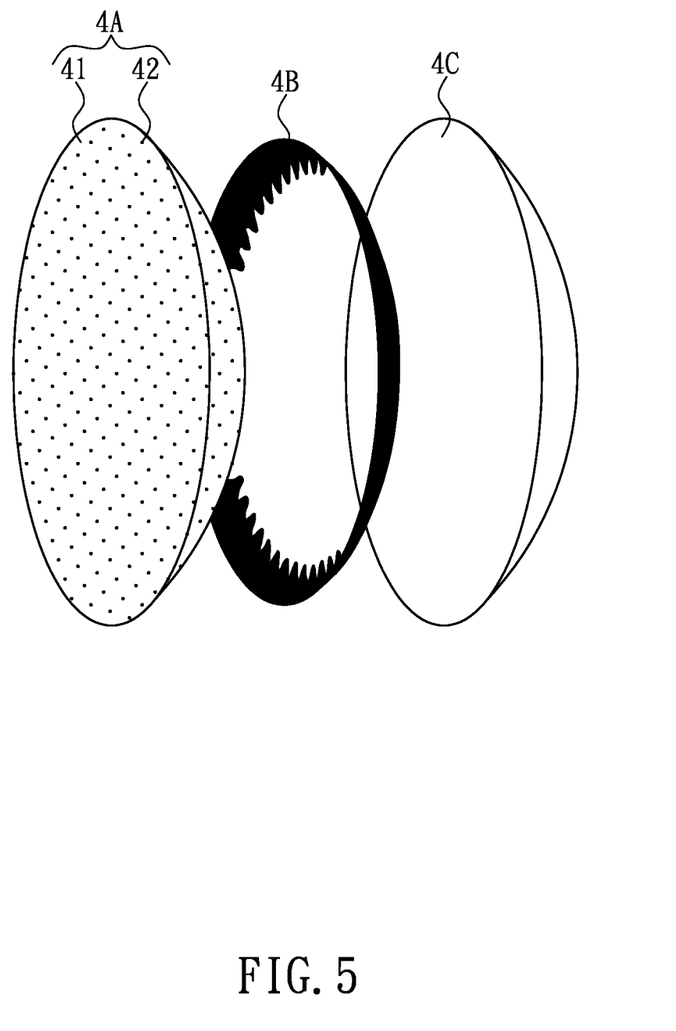
FIG. 5 schematically shows yet another eyeglass lens according to certain embodiments of the present disclosure.

Furthermore, the main body in the present disclosure can be used to make a colored contact lens as well as a clear one. In certain embodiments, as shown in FIG. 5, a colored contact lens is made by connecting an inner-layer plate 4A, a pigment plate 4B, and an outer-layer plate 4C together. The method of connecting the inner-layer plate 4A, the pigment plate 4B, and the outer-layer plate 4C is well known in the art and therefore will not be described in more detail. In certain embodiments, and by way of example only, the main body 41 of the inner-layer plate 4A contains and is mixed with the $Ag/SiO_x$ composite nanoparticles 42 while the outer-layer plate 4C is cured resin (i.e., without the $Ag/SiO_x$ composite nanoparticles 42). In certain embodiments, the inner-layer plate 4A and the outer-layer plate 4C may have their structures exchanged, or the outer-layer plate 4C may also contain and be mixed with the $Ag/SiO_x$ composite nanoparticles 42. Thus, the eyeglass lens material and the eyeglass lens according to the present disclosure are adaptable to various product configurations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for making an eyeglass lens capable of blocking blue light, wherein the eyeglass lens comprises a main body, the method comprising the steps of:
    dissolving $Ag/SiO_x$ composite nanoparticles in a first alcohol solvent, and adding a surface modifier to modify the $Ag/SiO_x$ composite nanoparticles;
    mixing modified $Ag/SiO_x$ composite nanoparticles into a resin to form a mixture, and filling a mold with the mixture; and
    subjecting the mixture to a material curing procedure until the mixture is cured and thus forms the main body, wherein the main body contains and is mixed with the $Ag/SiO_x$ composite nanoparticles,
    wherein the $Ag/SiO_x$ composite nanoparticles make up 0.00001%~10% by weight of the main body,
    wherein the $Ag/SiO_x$ composite nanoparticles are made by the steps of:
    dissolving silver nitrate in a solvent, and adding a protecting agent or a polymeric material to form a first solution;
    stirring the first solution while keeping the first solution at a temperature between 25° C. and 150° C.;
    adding a reducing agent solution to the first solution, and allowing first solution added with the reducing agent to rest for 1 hour to form a second solution;
    subjecting the second solution to centrifugation to obtain silver nanoparticles;
    re-dissolving the silver nanoparticles in a second alcohol solvent, and adding tetraethoxysilane or tetramethoxysilane to the silver nanoparticles-re-dissolved second alcohol solvent to form a third solution; and
    stirring the third solution at room temperature for 22~26 hours to obtain the $Ag/SiO_x$ composite nanoparticles.

2. The method according to claim 1, wherein the mixture further comprises a photoinitiator, and the material curing procedure comprises irradiating the mixture with ultraviolet light until the mixture is cured.

3. The method according to claim 1, wherein the mixture further comprises an initiator, and the material curing procedure comprises heating the mixture at a high temperature until the mixture is cured.

4. The method according to claim 1, wherein the main body is subjected to a hydration procedure after being removed from the mold.

5. The method according to claim 2, wherein the main body is subjected to a hydration procedure after being removed from the mold.

6. The method according to claim 3, wherein the main body is subjected to a hydration procedure after being removed from the mold.

7. The method according to claim 4, wherein the resin is formed by polymerizing at least one type of monomer selected from the group consisting of (hydroxyethyl)methacrylate, ethyleneglycoldimethacrylate, N-vinylpyrrolidone, and poly(methyl methacrylate).

8. The method according to claim 5, wherein the resin is formed by polymerizing at least one type of monomer selected from the group consisting of (hydroxyethyl)methacrylate, ethyleneglycoldimethacrylate, N-vinylpyrrolidone, and poly(methyl methacrylate).

9. The method according to claim 6, wherein the resin is formed by polymerizing at least one type of monomer selected from the group consisting of (hydroxyethyl)methacrylate, ethyleneglycoldimethacrylate, N-vinylpyrrolidone, and poly(methyl methacrylate).

\* \* \* \* \*